US012748648B2

(12) United States Patent
Padmanaban Anand

(10) Patent No.: US 12,748,648 B2
(45) Date of Patent: Sep. 29, 2026

(54) SYSTEMS AND METHODS FOR DETERMINING ERRORS DURING EXECUTION OF MULTIPLE APPLICATIONS

(71) Applicant: Citigroup, Inc., New York, NY (US)

(72) Inventor: Rajagopalan Padmanaban Anand, Irving, TX (US)

(73) Assignee: CITIGROUP, INC., New York, NY (US)

( * ) Notice: Subject to any disclaimer, the term of this patent is extended or adjusted under 35 U.S.C. 154(b) by 92 days.

(21) Appl. No.: 18/951,366

(22) Filed: Nov. 18, 2024

(65) Prior Publication Data

US 2025/0307049 A1 Oct. 2, 2025

Related U.S. Application Data

(63) Continuation of application No. 18/624,409, filed on Apr. 2, 2024, now Pat. No. 12,147,292.

(51) Int. Cl.

*G06F 11/00* (2006.01)
*G06F 11/07* (2006.01)
*G06F 11/3668* (2025.01)

(52) U.S. Cl.

CPC ........ *G06F 11/0766* (2013.01); *G06F 11/079* (2013.01); *G06F 11/3688* (2013.01)

(58) Field of Classification Search

CPC . G06F 11/0766; G06F 11/079; G06F 11/3688
See application file for complete search history.

(56) References Cited

U.S. PATENT DOCUMENTS

| | | | |
|---|---|---|---|
| 7,080,141 | B1 | 7/2006 | Baekelmans et al. |
| 7,937,623 | B2 | 5/2011 | Ramacher et al. |
| 8,823,536 | B2 * | 9/2014 | Avner ................ G06F 11/0748 709/204 |
| 8,874,971 | B1 | 10/2014 | Hayden et al. |
| 9,104,797 | B1 | 8/2015 | Sekhar et al. |
| 10,963,333 | B1 | 3/2021 | Nijim et al. |
| 11,556,510 | B1 | 1/2023 | Hanson et al. |
| 11,755,446 | B1 | 9/2023 | Agarwal et al. |

(Continued)

OTHER PUBLICATIONS

European Search Report on EP Application No. 25162165.2 mailed Nov. 7, 2025 (4 pages).

(Continued)

*Primary Examiner* — Joshua P Lottich
(74) *Attorney, Agent, or Firm* — Foley & Lardner LLP

(57) ABSTRACT

Presented herein are systems and methods for determining root cause of errors during execution of multiple applications. Systems include at least one processor to detect a cause analysis instruction identifying one or more systems; receive error metadata associated with a first operation error; determine a first debug operation set based on the error metadata; determine a first result associated with a first debug operation of the first debug operation set; and determine a second result associated with a second debug operation based on the first result for the first debug operation. The one or more processors can generate an error report based on the first result and the second result, the error report indicating each result and a next debug operation set of one or more next debug operations.

20 Claims, 8 Drawing Sheets

(56) References Cited

U.S. PATENT DOCUMENTS

| | | | |
|---|---|---|---|
| 12,314,150 | B1 | 5/2025 | Anumolu et al. |
| 2007/0143583 | A1* | 6/2007 | Cors ........................ H04L 69/40 713/1 |
| 2014/0081925 | A1 | 3/2014 | Haeberle et al. |
| 2015/0074471 | A1* | 3/2015 | Sainath ............... G06F 11/0787 714/57 |
| 2015/0121145 | A1* | 4/2015 | Mahajan ............. G06F 11/0778 714/37 |
| 2017/0235628 | A1 | 8/2017 | Nguyen et al. |
| 2017/0308422 | A1 | 10/2017 | Golash et al. |
| 2018/0032420 | A1 | 2/2018 | Wadsworth |
| 2018/0121323 | A1 | 5/2018 | Tucker et al. |
| 2019/0227904 | A1 | 7/2019 | Raviv et al. |
| 2019/0235999 | A1* | 8/2019 | Everitt .................. G06F 11/362 |
| 2019/0347154 | A1 | 11/2019 | Mattia et al. |
| 2020/0064823 | A1 | 2/2020 | Somercik |
| 2020/0409780 | A1 | 12/2020 | Balasubramanian et al. |
| 2020/0409831 | A1 | 12/2020 | Balasubramanian et al. |
| 2021/0326234 | A1 | 10/2021 | Albero et al. |
| 2022/0058449 | A1 | 2/2022 | Goodsitt et al. |
| 2023/0007857 | A1 | 1/2023 | Yang et al. |
| 2023/0021373 | A1 | 1/2023 | Kabbinale et al. |
| 2023/0067944 | A1 | 3/2023 | Ares et al. |
| 2023/0205678 | A1 | 6/2023 | Bollepally et al. |
| 2023/0259558 | A1 | 8/2023 | Subramaniam et al. |
| 2024/0028442 | A1 | 1/2024 | Harutyunyan et al. |
| 2024/0078244 | A1 | 3/2024 | Moresmau et al. |
| 2024/0193077 | A1 | 6/2024 | Alford et al. |
| 2024/0394139 | A1 | 11/2024 | Lushear et al. |
| 2025/0080395 | A1 | 3/2025 | Agarwal |

OTHER PUBLICATIONS

PCT International Search Report and Written Opinion for Application No. PCT/US2025/036210 mailed Nov. 3, 2025 (10 pages).

PCT International Search Report and Written Opinion for Application No. PCT/US2025/018438 mailing date Jul. 18, 2025, 15 pages.

* cited by examiner

SYSTEMS AND METHODS FOR DETERMINING ERRORS DURING EXECUTION OF MULTIPLE APPLICATIONS

CROSS-REFERENCE TO RELATED APPLICATIONS

This application is continuation of U.S. application Ser. No. 18/624,409, issuing on Nov. 19, 2024, as U.S. Pat. No. 12,147,292, filed Apr. 2, 2024, which is incorporated by reference in its entirety.

TECHNICAL FIELD

This application generally relates to techniques for automated root cause analysis for debug operations, including identifying local and global root causes of errors during execution of multiple applications having interrelated operational dependencies.

BACKGROUND

Enterprise networks host and execute a variety of interconnected applications programmed to provide any number of client-facing and backend services. The applications typically function in accordance with any number of dependencies, where an application relics upon inputs provided from one or more upstream applications. When an error occurs in an upstream application, it causes errors that can cascade to any number of downstream applications. Existing approaches to debugging errors in these environments are often performed manually by application teams who provide administrative support for certain applications in the chain. Even though there are tools available to automatically identify the occurrence of an error, determining the root cause of the error by analyzing error related data (e.g., log files, source code, configurations, settings, etc.) is often performed manually.

The existing approaches to debugging errors have any number of shortcomings. For instance, a problem is that conventional approaches to debugging the errors manually can be challenging and time-consuming, as an observed error could affect a downstream application that is far-removed from the initial upstream application where the initial error occurred. Another problem with conventional approaches to debugging is that a team addresses errors arising only within the scope of that team's application. Oftentimes, if an application team determines that an upstream application caused the error in a downstream application, then the application team will transfer the debugging responsibilities to another application team responsible for the upstream application. In this way, the conventional debugging approaches are performed sequentially by each application team until, eventually, a certain application team identifies the root cause of the initial error. These manual and sequential steps of conventional debugging approaches are time-consuming, inefficient, and concentrate institutional knowledge within certain individuals.

SUMMARY

Embodiments described herein include systems and methods for addressing shortcomings in the art and can provide any number additional or alternative benefits as well. The embodiments can include hardware and software computing components for automated processes for receiving or detecting operating errors across computing resources in a computing network architecture, identifying relationships or dependencies between computing resources, and determining a root cause of an error.

In some embodiments, an automated debugging software program (sometimes referred to as an "Auto Debugger") includes software routines for automatically performing preconfigured debugging operations across any number of applications in a set of applications having executable operations that were disrupted by operation errors. The set of applications can be associated with corresponding devices included in an enterprise system. In some circumstances, for a particular application, an operation error is endemic to the particular application, such that the operation error of the particular application is a root cause for downstream operation errors in downstream applications. In some circumstances, the operation error of a particular application is a local root cause, the operation error having been caused by the operation error of one or more upstream operation errors associated with one or more upstream applications.

The Auto Debugger can receive error detail metadata from applications of the enterprise system which, in examples, are stored in an error details database. When an error occurs, a root cause analysis engine associated with the Auto Debugger can receive or detect a triggering cause analysis instruction and automatically and simultaneously performs preconfigured debugging operations across applications affected by the error. The preconfigured operations eliminate the manual review performed by the application teams. Moreover, the root cause analysis engine automatically executes the preconfigured debugging operations for each impacted application in the set, thereby eliminating the sequential debugging steps of conventional approaches. By performing the debugging operations in parallel for each impacted application, the root cause analysis engine can determine the root causes described herein faster, enabling quicker responses by application teams. This, in turn, can reduce system downtime within an enterprise system and improve overall computing resource utilization.

Members of an application team (or other types of users) may preconfigure, update, or otherwise manage the debug operations of debug operation sets for each application for which the application team is responsible. In some cases, an application team can operate a dashboard to configure one or more debug operations as a set of debug operations that are stored in a debug datastore. When executed, the debug operations of the set of debug operations instruct the root cause analysis engine to execute the various preconfigured functions of the debug operations, such as data gathering, conditional testing, and error reporting. These preconfigured debug operations automate the process of analyzing the error related data from sources like log files or source code or configuration files and determining the root cause.

The root cause analysis engine can generate or update error reports indicating the types of errors that occurred within the applications based on the result of the preconfigured debug operations. The result of the execution of the debug operation set can include error details data associated with (e.g., represented by) an error report. Based on the error details data, root cause analysis engine can also determine the next debug operation set that the root cause analysis engine should execute.

The debug database includes any number of debug operation sets for any number of applications in an enterprise system. Each debug operation set includes the various types of functions and instructions to be executed by the root cause analysis engine. An error reporting operation may, for example, cause the root cause analysis engine to generate an error report based on the enriched metadata generated by the previously-executed debug operations in a debug operation set representing a given operation error of an application. In some embodiments, the error report data generated by the error reporting operation may satisfy a predetermined error scenario criteria associated with any one of the debug operation sets stored in the debug data store, which may be a debug operation set for the same application or another application. In this example, the root cause analysis engine can determine the next debug operation set according to the error scenario criteria defined by the next debug operation set matching with the error report data generated by the error reporting operation of the current debug operation set.

In some embodiments, the root cause analysis engine continues to perform the next debug operation of the debug operation set, and a final debug operation instructs the root cause analysis engine to generate an error report from the metadata gathered by the previous data gathering debug operations in the same debug operation set. The root cause analysis engine can then try to find a next debug operation set based on the error report data of the previous operation set matching the error scenario criteria associated with other debug operation sets in the debug data store. The root cause analysis engine can iteratively perform each next debug operation for each next debug operation set until there are no further mappings to a next debug operation set. In the case where there are no further debug operation sets mapped to a given debug operation set, the error report generated by the last debug operation set is identified as the final root cause.

The root cause engine can generate and transmit a root cause report to an end-user through, for example, an email or online dashboard. The final debug operation of a particular debug operation set for the application may cause the root cause analysis engine to generate an error report (can also be referred as a local root cause) which may satisfy the error scenario criteria of, for example, a next debug operation set of the next application or the same application. In some embodiments, the root cause analysis engine proceeds recursively through each next debug operations of each next debug operation set based on the functions and instructions of the debug operations, until identifying a global root cause for the one or more operation errors across the applications. In examples, a global root cause occurs when there are no further mappings to a next debug operation set of a next application. The root cause engine can generate and transmit the root cause report to the end-user through, for example, an email or online dashboard to indicate the global root cause and, in some cases, the one or more local root causes.

Embodiments discussed herein include a system that can include at least one processor to detect a cause analysis instruction identifying one or more systems associated with one or more operation errors; receive error metadata associated with a first operation error of the one or more operation errors; determine a first debug operation set comprising one or more debug operations based on the error metadata, the error metadata indicating one or more of: the first operation error, an error type associated with the first operation error, an application identifier associated with the first operation error or any number of key: value pairs of information associated with the first operation error; determine a first result associated with a first debug operation of the first debug operation set; determine a second result associated with a second debug operation based on the first result for the first debug operation; and generate an error report comprising updated error metadata based on the first result and the second result. In embodiments, the error report satisfies the error scenario criteria of a next debug operation set of one or more next debug operations. In some embodiments, when the error report satisfies the error criteria of a next debug operation, the root cause analysis engine can determine that the criteria of the next debug operation set is satisfied. In some aspects, the error report of a debug operation set that is generated by the root cause analysis engine in accordance with the final debug operation of that set, can indicate the next debug operation set. In some embodiments, the error report represents the root cause of the first operation error.

In aspects, the at least one processor is further programmed to: receive data associated with execution of an executable operation represented by the error metadata based on the first debug operation. The one or more processors programmed to determine the first result can be programmed to: determine the first result based on the data associated with the execution of the executable operation.

In some aspects, the at least one processor is further programmed to: receive data associated with execution of an executable operation corresponding to the error metadata based on the first debug operation; and update the error metadata based on the first result. In some embodiments, the at least one processor is further programmed to update the data associated with the execution of the executable operation corresponding to the error metadata based on the first result. The one or more processors programmed to determine the second result can be programmed to determine the second result based on the first result and the data associated with the execution of the executable operation.

In aspects, the at least one processor is further programmed to: determine a local root cause (which can be represented by an error report) based on the first result and the second result. In some embodiments, the at least one processor is further programmed to generate an error report based on the first result and the second result representing the root cause of the first operation error. In some aspects, the at least one processor that determines the second result associated with the second debug operation is programmed to: determine the second result based on the first result for the first debug operation and a state of the executable operation associated with the second debug operation.

In some aspects, the at least one processor that determines the second result associated with the second debug operation is programmed to: determine the second result associated with the second debug operation, where the second debug operation is associated with a second debug operation set, the second debug operation set associated with one or more debug operations different from the one or more debug operations of the first debug operation set.

In aspects, the at least one processor is further programmed to: compare a value associated with execution of the executable operation to one or more accepted values. The at least one processor that determines the first result or the second result can be programmed to: determine the first result or the second result based on the comparison of the value associated with execution of the executable operation to the one or more accepted values.

According to aspects, where the second result includes an indication that criteria associated with a predetermined error scenario is satisfied, the at least one processor can be further programmed to determine that a root cause is identified based on the indication that the criteria associated with the predetermined error is satisfied.

In some aspects, the second result includes an indication that criteria associated with a predetermined error scenario for a subsequent debug operation set associated with a same of a different application is satisfied. The at least one processor is further programmed to: generate a next error report based on the indication that the criteria associated with the predetermined error scenario for the subsequent debug operation set associated with the same or the different application is satisfied.

Embodiments discussed herein include a method that can include detecting, by at least one processor, a cause analysis instruction identifying one or more systems associated with one or more operation errors; receiving, by the at least one processor, error metadata associated with a first operation error of the one or more operation errors; determining, by the at least one processor, a first debug operation set comprising one or more debug operations based on the error metadata, the error metadata indicating one or more of the first operation error, an error type associated with the first operation error, or an application identifier associated with the first operation error or any number of key: value pairs of information associated with the first operation error; determining, by the at least one processor, a first result associated with a first debug operation of the first debug operation set; determining, by the at least one processor, a second result associated with a second debug operation based on the first result for the first debug operation; and generating, by the at least one processor, an error report comprising updated error metadata based on the first result and the second result, the error report satisfying the error scenario criteria associated with a next debug operation set of one or more next debug operations.

Some embodiments discussed herein include a non-transitory computer-readable medium storing instructions thereon that can, when executed by at least one processor, cause the at least one processor to: detect a cause analysis instruction identifying one or more systems associated with one or more operation errors; receive error metadata associated with a first operation error of the one or more operation errors; determine a first debug operation set comprising one or more debug operations based on the error metadata, the error metadata indicating one or more of: the first operation error, an error type associated with the first operation error, or an application identifier associated with the first operation error or any number of key: value pairs of information associated with the first operation error; determine a first result associated with a first debug operation of the first debug operation set; determine a second result associated with a second debug operation based on the first result for the first debug operation; and generate an error report comprising updated error metadata based on the first result and the second result, the error report indicating satisfying the eligibility criteria of a next debug operation set of one or more next debug operations.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate one or more embodiments, and together with the specification explain the subject matter of the disclosure.

DETAILED DESCRIPTION

Figure 1:
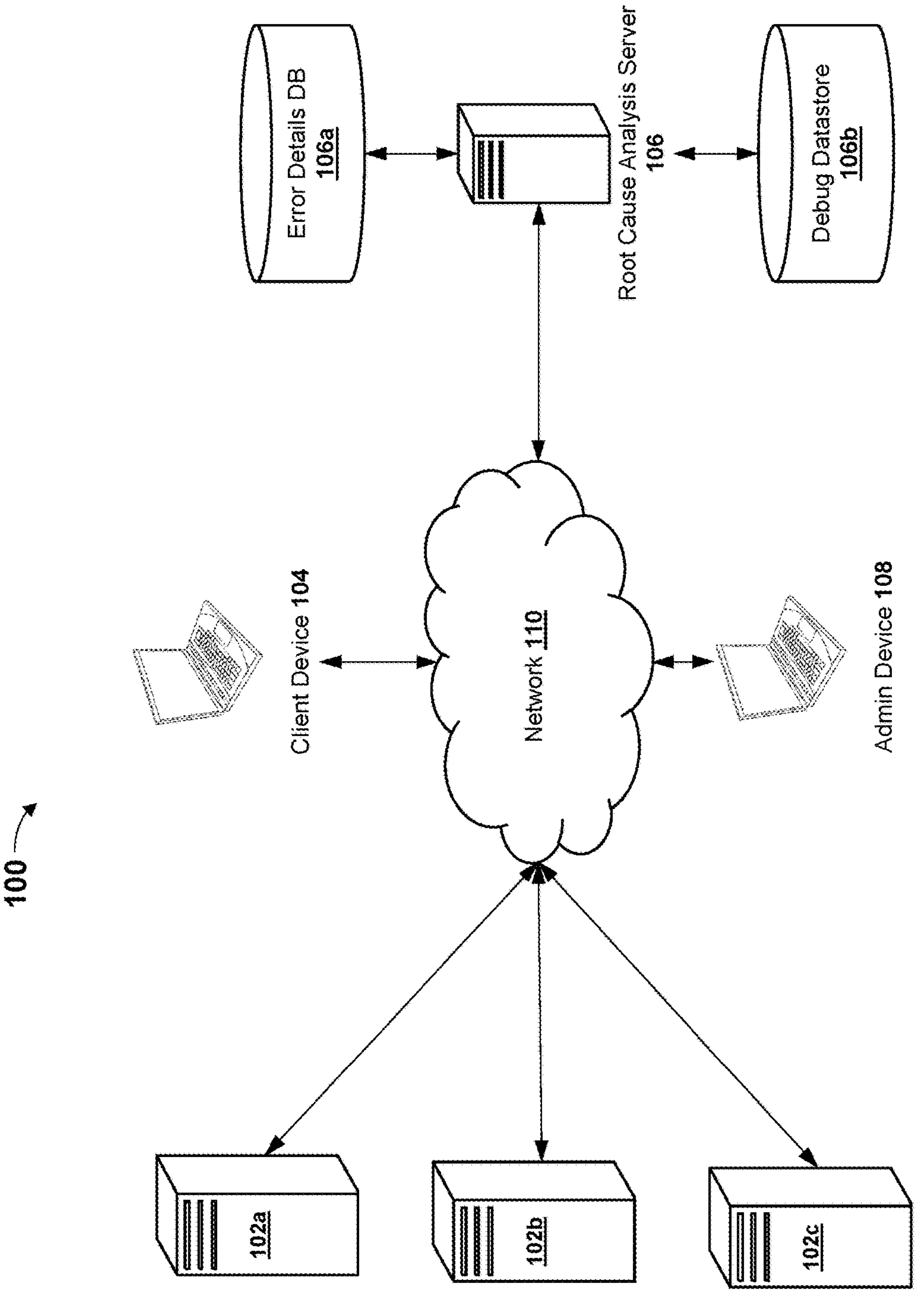
FIG. 1 is a block diagram of a network environment for determining a root cause of errors during execution of multiple applications, in accordance with one or more embodiments.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

FIG. 1 is a block diagram of an environment 100 according to one or more embodiments. The environment 100 includes servers 102*a*, 102*b*, 102*c* (referred to individually as server 102, and collectively as servers 102), a client device 104, a root cause analysis server 106, an administrator (admin) device 108, and a network 110. In some embodiments, servers 102, client device 104, root cause analysis server 106, and admin device 108 can interconnect (e.g., establish a connection to communicate and/or the like) via one or more wired or wireless connections (e.g., via network 110) as described herein.

Servers 102 can include any computing device comprising hardware and software components capable of performing the various processes described herein. For example, the servers 102 can include any device including memory and a processor capable of communicating with one or more other devices of FIG. 1 via the network 110. Non-limiting examples of the servers 102 include laptop computers, desktop computer, and/or the like. In some embodiments, the servers 102 are associated with users or groups of users that are further associated with an organization (e.g., a public company, a private company, a financial institution, a government institution, and/or the like). In some embodiments, the servers 102 work in coordination with one or more other servers or one or more other devices of FIG. 1 to perform one or more of the operations described herein.

Client device 104 can include any computing device comprising hardware and software components capable of performing the various processes described herein. For example, the client device 104 can include any device including memory and a processor capable of communicating with one or more other devices of FIG. 1 via the network 110. Non-limiting examples of the client device 104 include mobile devices (e.g., smartphones, tablets, and/or the like), laptop computers, desktop computer, and/or the like. In some embodiments, the client device 104 are associated with users or groups of users interacting with one or more applications as described herein. In some embodiments, the client device 104 work in coordination with one or other devices of FIG. 1 to perform one or more of the operations described herein.

The root cause analysis server 106 can include any computing device comprising hardware and software components capable of performing the various processes described herein. For example, the root cause analysis server 106 can include any device including memory and a processor capable of communicating with one or more other devices of FIG. 1 via the network 110. Non-limiting examples of the root cause analysis server 106 includes a laptop computer, a desktop computer, and/or the like. In some embodiments, the root cause analysis server 106 is associated with an organization. In some embodiments, the root cause analysis server 106 works in coordination with one or more other devices of FIG. 1 to perform one or more of the operations described herein.

The root cause analysis server 106 can be associated with (e.g., implements or is in communication with) an error details database 106*a* or a debug database 106*b*. The error details database 106*a* and the debug database 106*b* can include any computing device comprising hardware and software components capable of performing the various processes described herein. For example, the error details database 106*a* and the debug database 106*b* can include any device including memory and a processor capable of communicating with one or more other devices of FIG. 1 via the network 110. Non-limiting examples of the error details database 106*a* and the debug database 106*b* includes servers, network accessible storage devices, and/or the like. In some embodiments, the error details database 106*a* and the debug database 106*b* are associated with an organization. In some embodiments, the error details database 106*a* and the debug database 106*b* work in coordination with one or more other devices of FIG. 1 to perform one or more of the operations described herein.

The admin device 108 can include any computing device comprising hardware and software components capable of performing the various processes described herein. For example, the admin device 108 can include any device including memory and a processor capable of communicating with one or more other devices of FIG. 1 via the network 110. Non-limiting examples of the admin device 108 includes a laptop computer, a desktop computer, and/or the like. In some embodiments, the admin device 108 is associated with an organization. In some embodiments, the admin device 108 works in coordination with one or more other devices of FIG. 1 to perform one or more of the operations described herein.

The network 110 can include any device comprising hardware and software capable of establishing wired and/or wireless networks. For example, the network 110 can include a cellular network (e.g., a long-term evolution (LTE) network and/or the like), a local area network (LAN), a wide area network (WAN), a metropolitan area network (MAN), a telephone network (e.g., a public switched telephone network), an ad hoc network, an intranet, the Internet, a fiber optic-based network, a cloud computing network, and/or the like.

The data described herein can include data associated with executable operations (e.g., an executable operation involving one or more applications executed by one or more devices of FIG. 1). An executable operation may include reading, writing, or modifying data within a database. In examples, the database may be stored locally (e.g., in memory of one or more of the devices of FIG. 1). In other examples, the database may be stored in association with one or more servers 102. In some embodiments, the executable operation may represent the transmission or receipt of data between different computing devices of FIG. 1. In others, the executable operation may represent the transmission or receipt of data between different applications or processes involved in the execution of one or more applications by one or more devices of FIG. 1.

Figure 2:
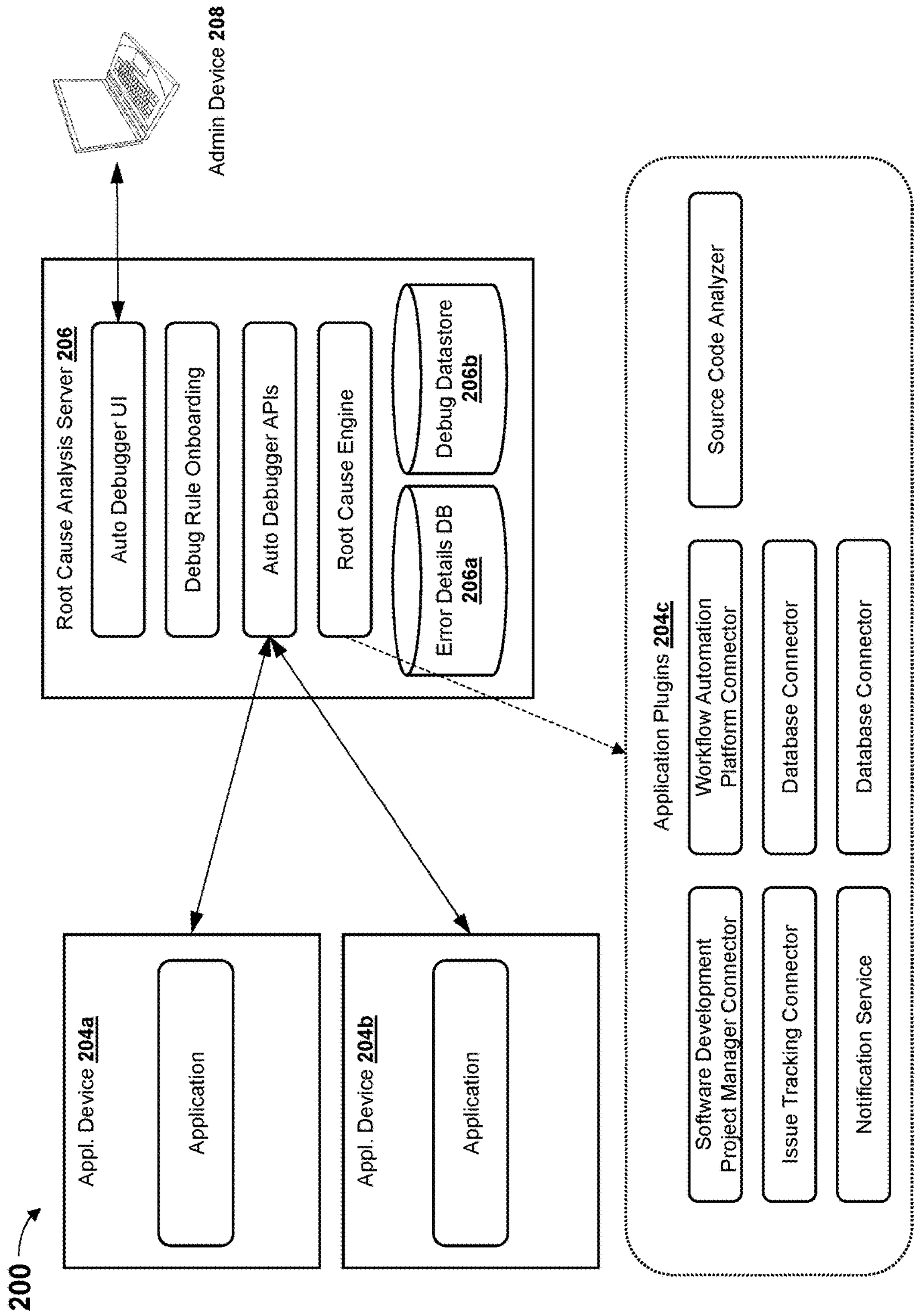
FIG. 2 is a block diagram of an example environment for determining a root cause of errors during execution of multiple applications, in accordance with one or more embodiments.

FIG. 2 is a block diagram of an example environment 200 for determining a root cause of errors during execution of multiple applications, in accordance with one or more embodiments. In some embodiments, the environment 200 includes application devices 204*a*, 204*b* (referred to individually as application device 204 and collectively as application devices 204), root cause analysis server 206, and admin device 208. In some embodiments, the application devices 204 are the same as, or similar to, the client device 104 or the servers 102 of FIG. 1. In some embodiments, the root cause analysis server 206 is the same as, or similar to, the root cause analysis server 106 of FIG. 1. In some embodiments, the admin device 208 is the same as, or similar to, the admin device 108 of FIG. 1.

The application devices 204 can include computing devices that are the same as, or similar to, the client device 104 of FIG. 1. The application devices 204 can include corresponding applications 204*c*, 204*d* that are configured to be executed by at least one processor of the respective application devices 204. The applications 204*c*, 204*d* can include (e.g., implement) a validator (e.g., a system or module that confirms format, content, etc., involved in a process of a particular executable operation adheres to predefined parameters, a handler (e.g., a system or module that processes requests for specific processes associated with the execution of the applications), and a caller (e.g., a system or module that initiates execution of the application 204*c*, 204*d*).

Each application and corresponding systems or modules can communicate with the root cause analysis server 206 via an application programming interface (API). For example, during execution of an applications by application devices 204*a*, 204*b*, data may be transmitted to the root cause analysis server 206 via an auto debugger API. The auto debugger API can be configured to receive the data directly from the applications 204*a*, 204*b* during execution of the applications by the application devices 204*a*, 204*b*.

The application plugins 206*c* can include a software development project manager connector, an issue tracking connector, a notification service, a cloud-based workflow automation platform connector, one or more database connectors, and a source code analyzer. Each of the application plugins 206*c* can be configured to form a bridge between the root cause analysis server 206 and other systems that serve as external sources of data related to the execution of the executable operations in applications by application devices 204*a*, 204*b*. For example, the root cause analysis server 206 can execute a debug operation from a debug operation set. In this example, the debug operation can be configured to retrieve configuration data from an external source system like a source code repository. In this example the root cause analysis server can invoke the appropriate plugin from application plugins 206*c* to fetch the configuration data from the source code repository.

The root cause analysis server 206 can include an auto debugger user interface (UI), a debug rule onboarding system or module, auto debugger APIs, and a root cause engine. The auto debugger UI may be configured to obtain data involved in an executable operation or the execution of a cause analysis instruction (described herein) and generate a graphical representation of the data involved in the executable operation. In some embodiments, the auto debugger UI can be configured to generate data associated with the graphical user interface and transmit the data to a display device (e.g., a display device of an admin device 208) to cause the display device to output the graphical user interface.

The auto debugger UI can include a configuration software tool that includes various interactive UIs for users (e.g., developers) to access and operate in order to create the debug operations and link them in a predefined order to form a debug operation set for various applications. The interactive UI can communicate with the debug rule onboarding system to access one or more databases containing debug operation templates and to store the debug operation sets created by the user. The auto debugger UI can present the interactive UIs to users in order to offer several debug operation templates. Embodiments can include one or more categories or types of debug operations, such as data gathering operations, data comparison operations, and error report generating operations.

The debug rule onboarding system or module may be configured to receive input (e.g., based on input provided by a user operating the auto debugger configuration tool's interactive UI from the admin device 208). The input may specify one or more debug operations to execute when determining a root cause in response to receiving a cause analysis instruction. In some embodiments, the one or more debug operations may be updated based on additional input provided by the user at the admin device 208. In this way, a user operating an admin device 208 can preconfigure one or more debug operations and debug operation sets as described herein.

A debug operation that implements data gathering operations can include various operations for obtaining (e.g., querying, retrieving, receiving, and/or the like) log data from log files or error metadata from a database (e.g., stored in an error details database 106*a*, 206*a*). In embodiments, a debug operation that implements data gathering operations can include various operations for obtaining user data associated with one or more users. The data gathering operations can make use of the application plugins 206*c* to connect to source systems like log files or databases for obtaining data.

A debug operation that implements data comparison operations can include various operations for verifying, confirming, checking, or otherwise determining whether a specific piece of data matches a particular value or range of values. As an example, a debug operation that implements data comparison operations can determine whether a payment amount is greater than certain threshold (e.g., "isPaymentAmount>$100"). As another example, a debug operation that implements data comparison operations can determine whether an account or an account number exists (e.g., "isAccountNo.=null").

A debug operation that implements error report generating operations can include various operations for generating or otherwise outputting reports as described herein. In some cases, a debug operation that implements error report generating can generate a report indicating detected errors, which can include indicators of the errors, applications in which errors occurred and one or more other indicators.

The auto debugger APIs can be configured to establish communication connections between the root cause analysis server 206 and the application devices 204. More specifically, the auto debugger APIs can be configured to receive data associated with executable operations from the application devices 204 via the auto debugger APIs and store the data associated with the executable operations in the error details database 206*a*. In some embodiments, the root cause analysis server 206 can receive additional data associated with the executable operations (e.g., during a cause analysis) and the root cause analysis server can update the data in the error details database 206*a*. In some embodiments, during a cause analysis, the root cause analysis server 206 can retrieve data stored in the error details database 206*a* and provide the data to a root cause engine as described herein.

The root cause engine can include a system or module that determines one or more root causes as described herein. For example, the root cause analysis server 206 can be configured to cause the root cause engine to receive data associated with an executable operation, the executable operation associated with an error. The root cause analysis server 206 can then cause the root cause engine to analyze the data associated with the executable operation in accordance with one or more debug operations. The one or more debug operations can be associated with one or more debug operation sets configured to enable the determination of a root cause. In some embodiments, a final debug operation of a debug operation set can include an operation that causes the root cause engine to generate a report including data associated with (e.g., representing) the root cause for a particular error involved in an executable operation. The root cause engine can then transmit data associated with the report to the auto debugger UI to cause the auto debugger UI to transmit the data associated with the report to the admin device 208. In this example, the report may be displayed via a display device of the admin device 208 to enable a user to address the root cause identified by the report.

The reports generated can include an identifier of the application that was associated with the origination of the root cause (e.g., the application that caused the operation error). In embodiments, the reports generated can include key: value pairs. For example, the reports generated can include key: value pairs that represent particular aspects of a given executable operation (e.g., values corresponding to predetermined fields represented by the executable operation data of a given executable operation) such as, for example, aspects specified by a given set of debug operations. Examples can include "errorType", "upstreamServiceName", "upstreamServiceErrorCode", "responseTime", "lineOfCode", "exceptionStackTrace" etc.).

The root cause analysis server 206 can cause the root cause engine to identify one or more subsequent debug operation sets based on an application that is associated with a root cause and one or more key: value pairs of error metadata from the error report generated by the previous debug operation set. Once an error report for a debug operation set is generated, in a set of upstream-downstream systems, the root cause analysis server 206 can forgo one or more debug operation sets and only perform the debug operation set mapped by the information in the preceding debug operation set's error report. The root cause analysis execution stops when a debug operation set cannot generate enough data in a report to satisfy the criteria for choosing the next debug operation set. The final root cause analysis report can be a compilation of all the error reports generated by the all the debug operation sets that executed with the final report identified as the root cause at the top.

The admin device 208 includes computing devices that is the same as, or similar to the admin device 108 of FIG. 1. In some embodiments, the admin device 208 is configured to receive data generated by the root cause analysis server 206 and generate a display based on the data. For example, in the case of an executable operation where a root cause for an error is determined by the root cause analysis server 206, the data generated by the root cause analysis server 206 can cause a display device of the admin device 208 to display the auto debugger UI indicating the root cause associated with the executable operation.

Figure 3:
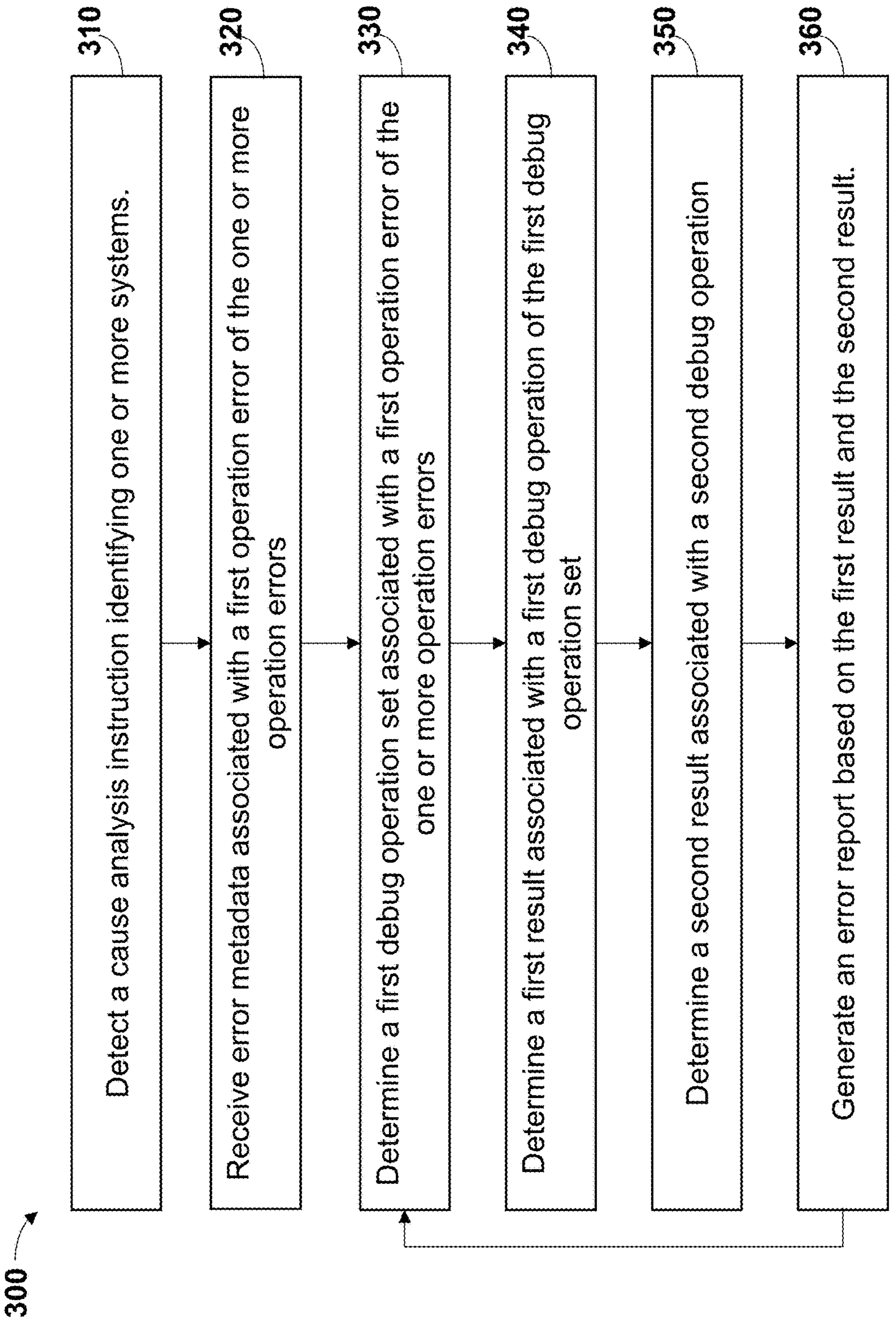
FIG. 3 is a flow diagram illustrating operations involved in a method for determining a root cause of errors during execution of multiple applications, in accordance with one or more embodiments.
Figure 4A:
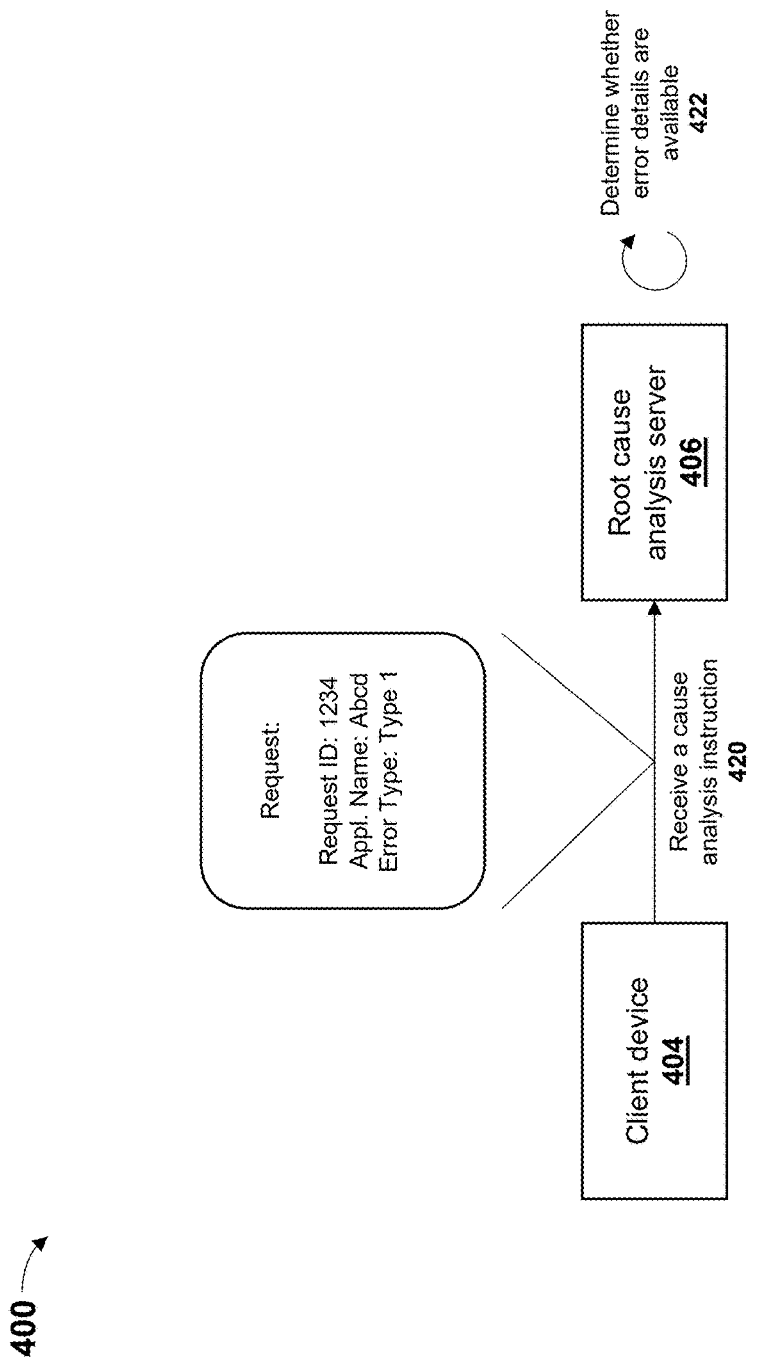
FIGS. 4A-4D illustrate a non-limiting example of an implementation of techniques for determining a root cause of errors during execution of multiple applications, in accordance with one or more embodiments.
Figure 4B:
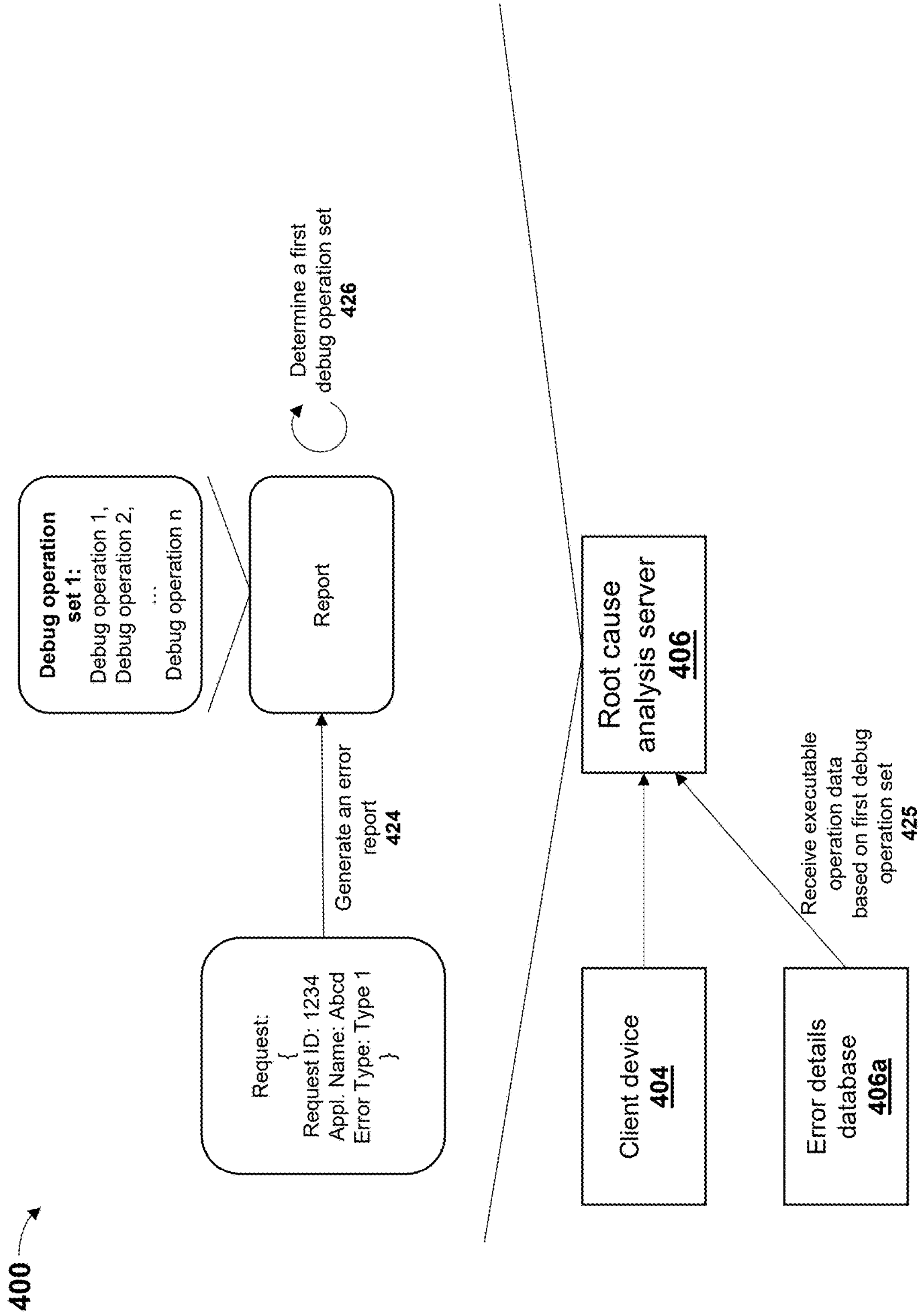
Figure 4C:
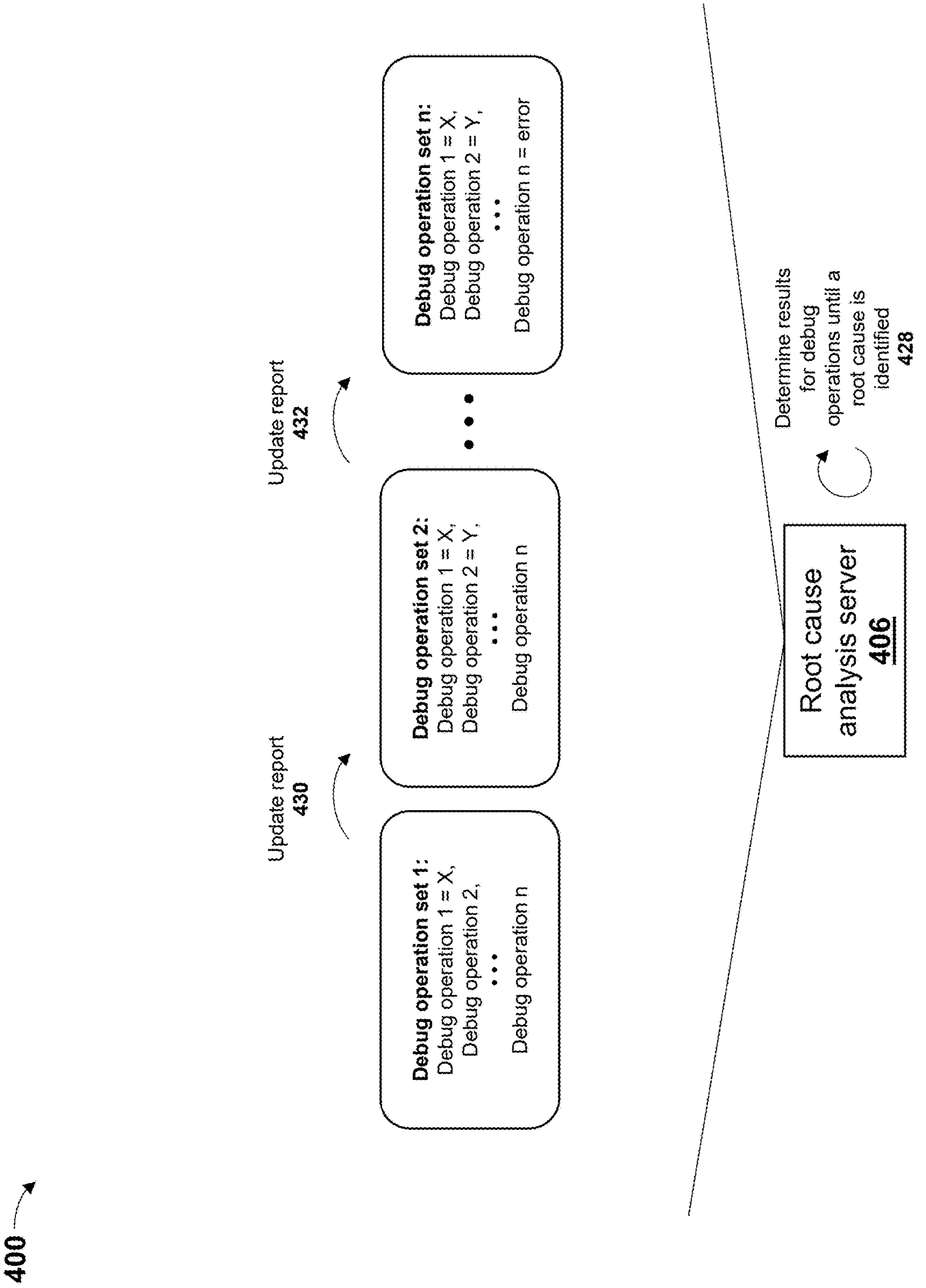
Figure 4D:
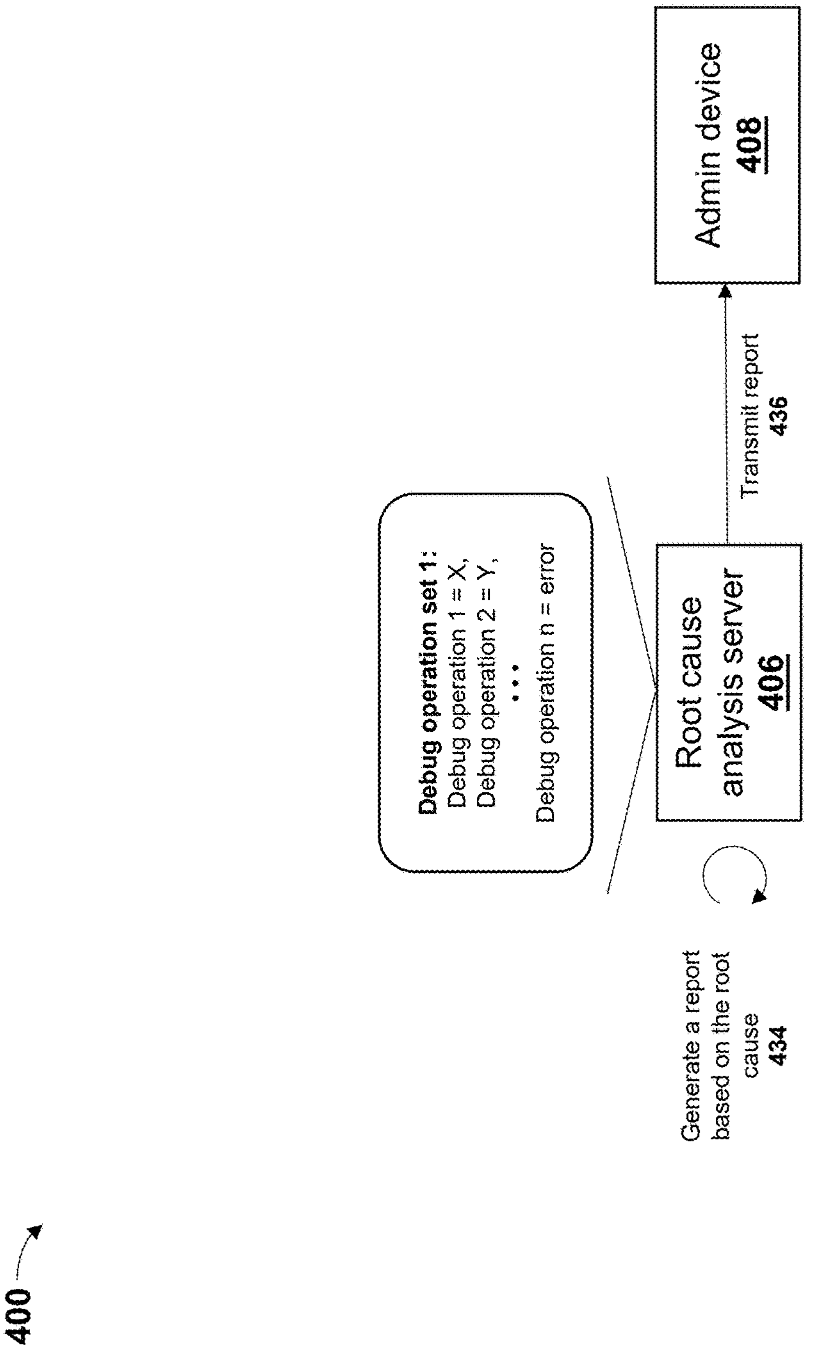

FIG. 3 is a flow diagram illustrating operations involved in a process 300 for determining root cause of errors during execution of multiple applications, in accordance with one or more embodiments. In some embodiments, the process 300 can include more or fewer operation than shown. The operations shown can be performed in the order shown, in a different order, or concurrently. In some embodiments, one or more operations of the process 300 can be performed by a root cause analysis server (e.g., a root cause analysis server that is the same as, or similar to, the root cause analysis servers 106, 206 of FIGS. 1-2, respectively). In some embodiments, one or more operations involved in the process 300 can be performed by a device different from, or in coordination with, one or more of the computing devices of FIGS. 1-2.

At operation 310, the root cause analysis server detects a cause analysis instruction identifying one or more systems. For example, the root cause analysis server can detect a cause analysis instruction identifying one or more systems and error metadata associated with an executable operation, the one or more systems associated with one or more operation errors as described herein. In an example, the root cause analysis server can detect a cause analysis instruction based on the root cause analysis server receiving a message from one or more computing devices (e.g., computing devices that are the same as, or similar to, one or more servers (e.g., servers that are the same as, or similar to, servers 102 of FIG. 1), one or more client devices (e.g., client devices that are the same as, or similar to, client devices 104 of FIG. 1), or one or more admin devices (e.g., admin devices that are the same as, or similar to, admin device 108 of FIG. 1). In examples, the message can represent the cause analysis instruction. For example, the message can include one or more of a request identifier, an application name identifier, or an error type identifier and/or other key: value pairs of data associated with the error. The request identifier can include an identifier specifying that the request is associated with a transaction where the error happened. The application name identifier can include an identifier specifying an application that is associated with a possible failure involved in the execution of one or more processes by the computing device transmitting the message. The error type identifier can include an identifier indicating a specific kind of error from among multiple possible errors associate associated with one or more executable operations involved in the execution of a given application.

The root cause analysis server can determine one or more systems associated with (e.g., involved in) the cause analysis instruction. For example, the root cause analysis server can determine the one or more systems associated with the cause analysis instruction based on one or more identifications of one or more systems by the cause analysis instruction. In examples, the root cause analysis server determines the one or more systems associated with the cause analysis instruction based on the error metadata included in the cause analysis instruction. In this example, the error metadata can identify (e.g., be mapped to) the one or more systems involved in executable operations that are the same as, or similar to, the executable operation involved in the cause analysis instruction. In examples, the error metadata can be used by the root cause analysis server to lookup the one or more systems involved. In some embodiments, the one or more systems can include any of the other computing devices of FIGS. 1-2.

The root cause analysis server can determine whether error details are available based on the cause analysis instruction. For example, the root cause analysis server can determine whether error details are available based on the root cause analysis server requesting the error details from one or more computing devices. In some examples, the root cause analysis server can request the error details from an error details database that collects data associated with executable operations involving at least one error. In examples, the root cause analysis server can request the error details from the computing device that transmitted the cause analysis instruction. In some examples, the root cause analysis server can request the error details from one or more other systems. In these examples, the one or more other systems can include the one or more other systems determined by the root cause analysis server as being associated with the cause analysis instruction or involved in executing one or more applications involved in the cause analysis instruction. In some embodiments, where the root cause analysis server does not receive error details, the root cause analysis server can determine that error details are not available and transmit a response (e.g., to the device that initiated the cause analysis instruction) that operation errors were not detected. In embodiments, where the root cause analysis server receives error details, the root cause analysis server can determine one or more results corresponding to debug operations as described herein.

At operation 320, the root cause analysis server receives error metadata associated with a first operation error of the one or more operation errors. In an example, the root cause analysis server can receive the error metadata associated with the first operation error of the one or more operation errors based on the root cause analysis server analyzing the error metadata (e.g., the metadata associated with the cause analysis instruction). For example, the root cause analysis server can receive data associated with a first operation error where the data associated with the first operation error is included with the cause analysis instruction (e.g., by the computing device that transmitted the cause analysis instruction). In examples, the root cause analysis server can receive data associated with the first operation error based on the root cause analysis server transmitting the request for error details as described above. In examples, the root cause analysis server can query an error details database (e.g., an error details database that is the same as, or similar to, the error details database 106*a* of FIG. 1) for the error details based on the error metadata. The error details database may be involved in monitoring (e.g., may be receiving and indexing error metadata transmitted by one or more devices described herein and/or obtained by the root cause analysis server) execution of one or more applications by one or more computing devices across a distributed computing environment (e.g., the devices of FIG. 1) that are further associated with an organization, the one or more computing devices including the computing device involved in the cause analysis instruction. In these examples, the root cause analysis server can receive the data associated with the first operation error from the error details database.

The first operation error can be associated with an error that occurs during execution of an application. For example, the first operation error can be associated with an error that occurs during execution of an application by a client device (e.g., the client device 104 of FIG. 1). In examples, the first operation error can be associated with an executable operation involved in the execution of the first operation. An executable operation can include the execution of a process in connection with the first application by the client device. In examples, the first operation error can be associated with an error that occurs at a device other than the client device during execution of an application by a client device. In these examples, the first operation error can be associated with the execution of a process in connection with the first application by another device (e.g., a server) involved in the executable operation. In examples, the first operation error can be associated with the execution of a process by another application involved in the execution of the application by the client device. In one illustrative example, the first operation error can be associated with the execution of a process by an application implemented by one or more servers (e.g., the servers 102 in FIG. 1) in coordination with the process of the application executed by the client device.

In one illustrative example, where an application is executed by a client device, an executable operation can involve generating and communicating data between the client device and a server. A first operation error can occur where data is unavailable or otherwise cannot be transmitted by the server to the client device (e.g., a session could not be established or reestablished, the data was not available due to a failure of one or more upstream or downstream processes, and/or the like) in response to communications from the client device. In this way, the first operation error can be associated with one or more errors that occur at one or more other devices involved in an executable operation.

At operation 330, the root cause analysis server determines a first debug operation set associated with a first operation error of the one or more operation errors. In an example, the root cause analysis server can determine the first debug operation set associated with the first operation error of the one or more operation errors based on the error metadata and one or more of a first operation error, an error type associated with the first operation error, or an application identified as being associated with the first operation error. For example, the root cause analysis server can determine the first debug operation set based on the root cause analysis server comparing the error metadata to predefined error scenario criteria for a debug operation set. In this example, the error metadata (e.g., one or more of the fields of the error metadata that match one or more fields of the error scenario criteria) can correspond to one or more debug operation sets (e.g., debug operation sets corresponding to the given error scenario), and the root cause analysis server can determine the first debug operation set based on the root cause analysis server determining the correspondence between the error metadata of the cause analysis instruction, and the correspondence of the error metadata to the error scenario criteria of one or more debug operation sets. In one illustrative example, where the error metadata corresponds to an executable operation involving an application executed by a client device and where the first operation error corresponds to one or more predetermined error scenario for that application, the root cause analysis server can determine a correspondence between the first operation error and a predetermined error scenario for that application. The root cause analysis server can then determine a correspondence between the predetermined error scenario and the first debug operation set.

The first debug operation set can be associated with one or more debug operations. For example, the first debug operation set can be associated with one or more debug operations that can be performed by the root cause analysis server. In some embodiments, the one or more debug operations may be associated with discrete processes that are executed to isolate errors that can occur during execution of applications that are the same as, or similar to, the application involved in the causes analysis instruction. Each of the one or more debug operations of a debug operation set can return one or more values associated with the execution of processes implemented by an application. The root cause analysis server can recursively determine and evaluate subsequent debug operations in a debug operation set until a report generating operation is determined. In some embodiments, the root cause analysis server can execute the report generating operation and generate an error report based on the result of all the preceding debug operations.

In some embodiments, the error report generated by the report generating operation may contain data that maps to a predefined error scenario for the subsequent debug operation set. The root cause analysis server can keep executing all the debug operations of each of the subsequent debug operation sets until the error report generated by the last debug operation of a current debug operation set does not map to any predefined error scenario of any of one or more subsequent debug operation sets. In this way, the root cause analysis server can maintain a stack of error reports (including error report outputs) for debug operation sets as the root cause analysis server steps through a hierarchy of debug operations and debug operation sets (see, e.g., FIG. 5) to determine the source of an error as opposed to stepping through multiple debug operations (e.g., associated with suspected upstream and/or downstream errors) until finding an error and working forward or backward from that error until determining a root cause for the error. In some embodiments, the root cause analysis server can determine (e.g., execute) the one or more debug operations of the first debug operation set or any other debug operation set involved in (e.g., mapped to) a root cause analysis described herein until the root cause analysis server cannot determine the subsequent debug operation set. In this way, the root cause analysis server can generate a report as described herein where the report includes results associated with each debug operation of a given debug operation set being evaluated by the root cause analysis server.

The debug operations of a debug operation set (e.g., the first debug operation set or other debug operation sets as described herein) may be associated with a hierarchy. For example, the debug operations of a debug operation set may be associated with a hierarchy (sometimes referred to as a mapping) that corresponds to an order in which one or more processes associated with an application are executed. In some embodiments, the debug operations may be associated with execution of the application by one device (e.g., a client device). In embodiments, the debug operations may be associated with the execution of multiple processes involving multiple computing devices. In one illustrative example, where a client device executes an application that transmits a request for data from another device (e.g., a server), a first debug operation may be associated with a process involved in generating the request by the client device. In this example, a second debug operation may be associated with a process involved in determining the data to provide in response by the server. In this way, the debug operations may correspond to one or more processes that are executed chronologically during execution of processes involving one or more applications.

At operation 340, the root cause analysis server determines a first result associated with a first debug operation of the first debug operation set. For example, the root cause analysis server can determine the first result associated with the first debug operation based on the root cause analysis server executing one or more processes associated with the first debug operation. In an example, the first debug operation can be for data gathering associated with the first debug operation set (e.g., for one or more debug operations of the first debug operation set. In examples, the root cause analysis server can continue to execute processes associated with the first debug operation and subsequent processes associated with subsequent debug operations of the first debug operation set in accordance with a hierarchy corresponding to the first debug operation set.

In some embodiments, the root cause analysis server determines the first result based on data associated with the execution of the executable operation. For example, as noted above, the root cause analysis server can request the error details for the executable operation associated with the cause analysis instruction (e.g., from an error details database). In an example, the root cause analysis server can receive data associated with execution of the executable operation from the computing device associated with the cause analysis instruction or the error details database. In this example, the data associated with execution of the executable operation can include an event log and/or the like. In some embodiments, the root cause analysis server can then determine the first result based on the data associated with the execution of the executable operation. For example, the root cause analysis server can determine the first result based on the root cause analysis server executing one or more processes associated with the first debug operation.

At operation 350, the root cause analysis server determines a second result associated with a second debug operation. For example, the root cause analysis server can determine a second result associated with a second debug operation of the first debug operation set. The second debug operation can be associated with a report generation operation. In examples, the root cause analysis server can determine a second result associated with a second debug operation, where the second debug operation is associated with a second debug operation set. In these examples, the root cause analysis server can determine the second result based on the root cause analysis server determining that the debug operations of the first debug operation set were all executed and the generated error report was indicative of (e.g., mapped to) the second debug operation set.

In some embodiments, the root cause analysis server determines the second result based on data associated with the execution of the executable operation. For example, as noted above, the root cause analysis server can request the error details for the executable operation associated with the cause analysis instruction (e.g., from an error details database). In some embodiments, the root cause analysis server can receive data associated with execution of the executable operation based on the root cause analysis server requesting the error details for the executable operation based on (e.g., subsequent to) the root cause analysis server determining the first result. For example, the root cause analysis server can request additional data associated with the execution of the executable operation based on the root cause analysis server determining that the first result indicates the successful completion of one or more operations by one or more systems involved in the executable operation. The root cause analysis server can then receive the additional data and update the error metadata associated with the execution of the executable operation.

In some embodiments, the root cause analysis server can determine the second result based on the first result and the data associated with the execution of the executable operation. For example, the root cause analysis server can determine the second result associated with the second debug operation based on the root cause analysis server executing (or causing execution of) one or more processes associated with the second debug operation. In this example, the root cause analysis server can execute the one or more processes associated with the second debug operation based on the first result or the data associated with the execution of the executable operation. In some embodiments, the data associated with the execution of the executable operation can represent a state of the executable operation being analyzed by the root cause analysis server after successful execution of the one or more processes associated with the first debug operation.

In some embodiments, the second debug operation is associated with a second debug operation set that includes one or more debug operations that are different from the one or more debug operations of the first debug operation set. For example, each debug operation set may be designed to target one or more predetermined error scenarios for identification. In this example, each debug operation set may also identify one or more subsequent debug operation sets In this way, a given debug operation set can indicate one or more processes to perform in order to determine a root cause.

In some embodiments, where the first result and the second result are associated with one or more values, the root cause analysis server executes a second debug operation that can compare the one or more values to one or more accepted values (e.g., values corresponding to accepted outputs, described above). For example, where an executable operation involves one or more processes that can result in the generation of values within specific ranges, and the first debug operation is configured to gather the data associated with the values generated by the executable operation. In this example the root cause analysis server can execute a second debug operation that can compare the one or more values determined during the analysis of the instant executable operation by the root cause analysis server to the values within the specific ranges. Where the values associated with the instant executable operation satisfy the values associated with the specific range, the root cause analysis server can determine the first result (e.g., that the values are accepted values) is associated with successful execution of an executable operation. Where the values associated with the instant executable operation do not satisfy the values associated with the specific range, the root cause analysis server can determine the first result is associated with unsuccessful execution of the executable operation. In this way, the root cause analysis server can determine whether one or more criteria associated with a predetermined error (e.g., values outside of acceptable value ranges) are satisfied and the subsequent report generating debug operation determined by the root cause analysis server can determine the root cause based on the one or more criteria being satisfied.

At operation 360, the root cause analysis server executes an error report generating debug operation that generates an error report based on the first result and the second result. For example, the debug operation executed by the root cause analysis server can generate an error report based on the first result and the second result, where the error report includes key: value pairs of data gathered from the first result and the second result. In some embodiments, the error report can contain data that are indicative of a root cause. For example, the root cause analysis server can determine the root cause based on the first result and the second result. In this example, the root cause analysis server can generate the error report where an indicator of the root cause is included in the error report. In some embodiments, the error report can include an indication that the one or more first errors are not present and an indication that one or more second errors are present. In some embodiments, operations 330-360 can be repeated (e.g., executed in a loop) until additional debug operation sets do not map to a given debug operation set, as described herein.

In some embodiments, the root cause analysis server determines a root cause. For example, the root cause analysis server can determine that the second debug operation is associated with one or more errors. In this example, the root cause analysis server can determine the root cause based on the one or more errors associated with the second debug operation. In one illustrative example, where the second debug operation is associated with an error where data is not available in association with a given executable operation, the root cause analysis server can determine that the root cause is associated with the lack of data available for the given executable operation. In this way, a user (e.g., a user associated with an admin device as described herein) can review the report and address the root cause identified by the report without unnecessarily troubleshooting other suspected causes.

In some embodiments, the root cause analysis server generates a report based on the root cause. For example, the root cause analysis server can generate a report based on the root cause analysis server determining results for debug operations. In some examples, where the root cause analysis server determines a root cause is represented by one or more results of a debug operation set, the root cause analysis server can generate a report that includes one or more results determined by the root cause analysis server during evaluation of one or more debug operation sets. In some embodiments, where the root cause analysis server evaluates multiple debug operation sets, the root cause analysis server can include the one or more results determined during the evaluation of the multiple debug operation sets. In this way, the root cause analysis server can generate a report that includes the results that correspond to a given root cause as described herein. In some embodiments, where the root cause analysis server determines that one or more results are indicative of a root cause (e.g., one or more results of operations included in a debug operation set specify a root cause) the root cause analysis server can generate a report specifying the root cause.

FIGS. 4A-4D illustrate a non-limiting example of an implementation 400 of techniques for determining a root cause of errors during execution of multiple applications, in accordance with one or more embodiments. In some embodiments, the implementation 400 includes a client device 404, a root cause analysis server 406, and an admin device 408. In some embodiments, the client device 404 is the same as, or similar to, the client device 104 of FIG. 1. In some embodiments, the root cause analysis server 406 is the same as, or similar to, the root cause analysis server 106 of FIG. 1. In some embodiments, the admin device 408 is the same as, or similar to, the admin device 108 of FIG. 1.

At operation 420, the root cause analysis server 406 receives a cause analysis instruction from the client device 404. An application of the client device 404 may generate or otherwise originate the cause analysis instruction. The cause analysis instruction specifies a request identifier "1234", an application name "Abcd", and an error type "Type 1." In some implementations, the request identifier is unique to the executable operation involved (e.g., the data exchange in which an error occurred).

At operation 422, the root cause analysis server 406 determines whether error details are available. In some implementations, where no error details are available, the root cause analysis server 406 responds (e.g., to the client device 404) that the existence of the error was not confirmed. In some implementations, where error details are available, the root cause analysis server 406 can obtain the error details.

At operation 424, the root cause analysis server 406 generates an error report. The error report may be iteratively updated as the root cause analysis server 406 determines one or more debug operations as described herein.

At operation 425, the root cause analysis server 406 receives executable operation data based on the first debug operation set. For example, the root cause analysis server 406 can receive the executable operation data from the client device 404 that transmitted the cause analysis instruction or an error details database 406*a* (e.g., an error details database that is the same as, or similar to, the error details database 106*a* of FIG. 1).

At operation 426, the root cause analysis server 406 determines a first debug operation set. The first debug operation set includes debug operations 1-*n*. While implementation 400 is discussed with respect to one debug operation set, it will be understood that (as described with respect to the description of FIG. 3, above) multiple debug operation sets may be analyzed until a root cause is identified.

In some embodiments, the debug operation sets can be preconfigured (e.g., by a user such as an administrator, a team of administrators, an application development team, and/or the like) operating an admin device as described herein to include one or more debug operations. For example, any application team that is part of an organization that is associated with a distributed computing environment (e.g., that is the same as, or similar to, the environment 100 of FIG. 1) can create debug operation sets and debug operations as described herein for various error scenarios that are likely to affect applications supported by the application team. In some embodiments, the one or more debug operation sets associated with a given application can be stored in a database of the root cause analysis server 406 (e.g., a debug datastore that is the same as, or similar to, the debug datastore 106*b* of FIG. 1). In some embodiments, the one or more debug operation sets can be associated with a debug operation template for a particular application as described herein.

At operation 428, the root cause analysis server 406 determines results for debug operations. For example, the root cause analysis server 406 can determine results for debug operations in order of a hierarchy or application dependencies indicated by performing the debug operation set(s). The root cause analysis server 406 can determine the error report of each debug operation set recursively until a debug operation set (e.g., a debug operation set "n"), produces an error report that does not map to any subsequent debug operation set. The root cause analysis server can include all the error reports generated by all the debug operation sets and indicate the final error report generated by the debug operation set n as the final root cause of the error.

At operation 430 and operation 432, the root cause analysis server 406 adds the error report generated by the debug operation sets to a stack of error reports. As will be understood, the root cause analysis server 406 iteratively updates the stack of error report through the execution of each subsequent debug operation sets until a subsequent debug operation set cannot be identified based on the error report generated by the previous debug operation set. In this case, the root cause analysis server 406 can identify the error report generated by the final debug operation set as the root cause of the original error data that the root cause analysis server received as part of the root cause analysis instruction in operation 420.

At operation 434, the root cause analysis server 406 generates a report based on the root cause. For example, the root cause analysis server 406 can generate a report based on the root cause analysis server 406 determining results for debug operation sets. In some examples, where the root cause analysis server 406 determines a root cause is represented by one or more results of a debug operation set, the root cause analysis server 406 can generate a report that includes one or more results determined by the root cause analysis server 406 during evaluation of one or more debug operation sets. In some embodiments, where the root cause analysis server 406 evaluates multiple debug operation sets, the root cause analysis server 406 can include the one or more results determined during the evaluation of the multiple debug operation sets. In this way, the root cause analysis server 406 can generate a report that includes the results that correspond to a given root cause as described herein, which may include a report file configured for display via a graphical user interface of a client computing device.

At operation 436, the root cause analysis server 406 transmits the report. For example, the root cause analysis server 406 can transmit the report to the admin device 408 based on (e.g., upon) the root cause analysis server 406 identifying the root cause. In some implementations, upon receipt of the report, the admin device 408 can open a ticket to assign one or more individuals associated with one or more teams to resolve the issue(s) associated with the root cause that is identified by the report.

Figure 5:
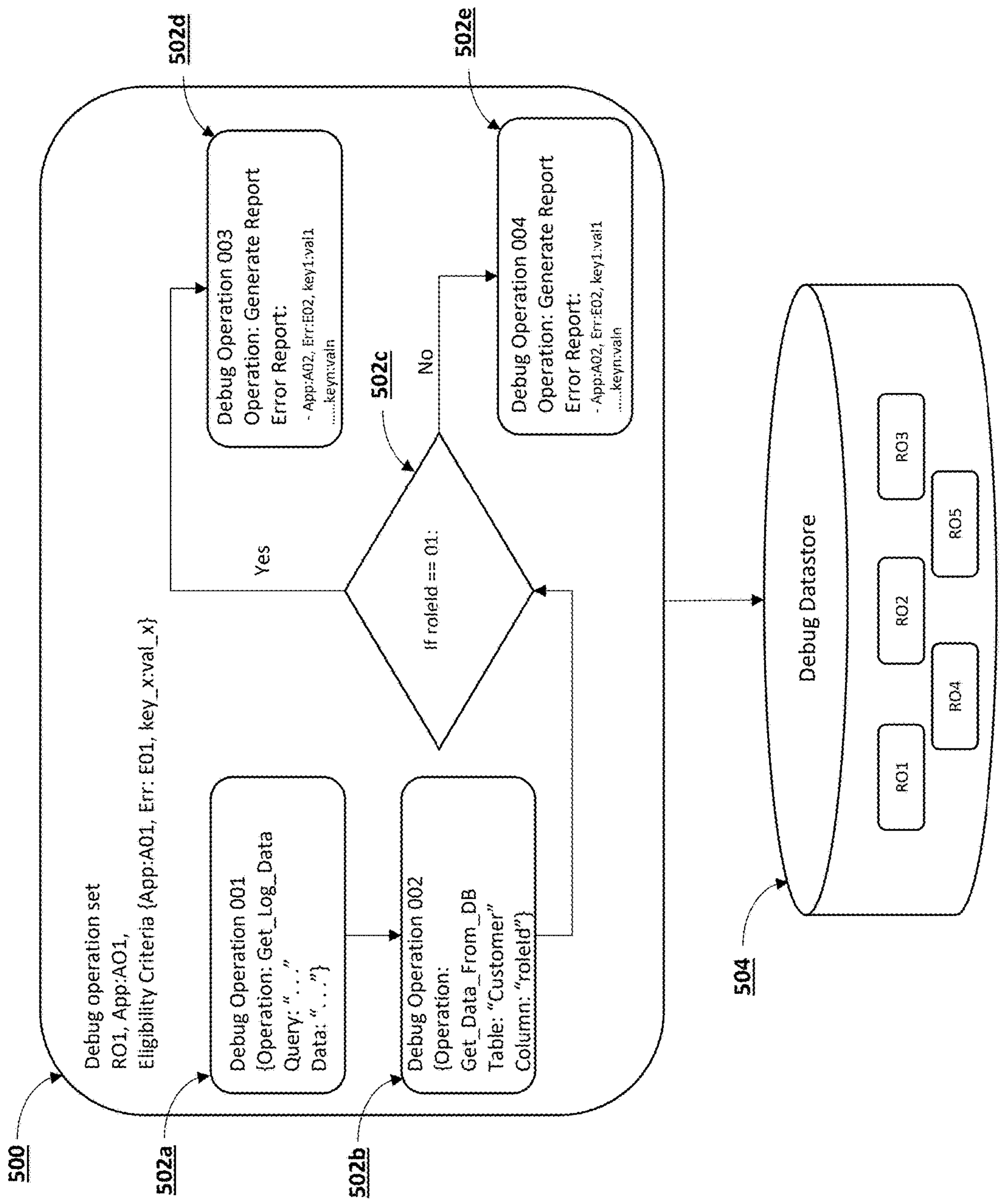
FIG. 5 illustrates a non-limiting example of a debug operation set and associated debug operations, in accordance with one or more embodiments.

FIG. 5 illustrates a non-limiting example of a debug operation set 500 and associated debug operations 502*a*-502*e*, in accordance with one or more embodiments. As illustrated, the debug operation set 500 includes a first debug operation 502*a* that gathers data from log files. The first debug operation 502*a* is followed by (e.g., mapped to) a second debug operation 502*b*, that involves gathering data from a database. The second debug operation 502*b* is followed by a third debug operation 502*c* that checks for a condition by comparing data elements collected by first debug operation 502*a* and second debug operation 502*b* to a specific value. Where the third debug operation 502*c* satisfies the condition, a fourth debug operation 502*d* is evaluated. Where the third debug operation 502*c* does not satisfy the condition, a fourth debug operation 502*e* is evaluated. Based on the outcome of debug operation 502*c*, either of the debug operation 502*d* or 502*e* is the final debug operation to be evaluated. In each of these cases, the debug operations 502*a*, 502*b*, 502*c*, 502*d*, 502*e* are each stored as part of the debug operation set 500 in a debug data store 504 and can be recalled iteratively as each debug operation is evaluated. In some cases, when there are no debug operations indicating or point to further next operation sets for any next or subsequent applications stored in the debug data store 504, then a root cause for the particular application is identified as a global root cause.

The foregoing method descriptions and the process flow diagrams are provided merely as illustrative examples and are not intended to require or imply that the steps of the various embodiments must be performed in the order presented. The steps in the foregoing embodiments can be performed in any order. Words such as "then," "next," etc., are not intended to limit the order of the steps; these words are simply used to guide the reader through the description of the methods. Although process flow diagrams can describe the operations as a sequential process, many of the operations can be performed in parallel or concurrently. In addition, the order of the operations can be re-arranged. A process can correspond to a method, a function, a procedure, a subroutine, a subprogram, and the like. When a process corresponds to a function, the process termination can correspond to a return of the function to a calling function or a main function.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

Embodiments implemented in computer software can be implemented in software, firmware, middleware, microcode, hardware description languages, or any combination thereof. A code segment or machine-executable instructions can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions can be stored as one or more instructions or code on a computer-readable or processor-readable storage medium. The steps of a method or algorithm disclosed herein can be embodied in a processor-executable software module, which can reside on a computer-readable or processor-readable storage medium. A computer-readable or processor-readable media includes both computer storage media and tangible storage media that facilitate transfer of a computer program from one place to another. A processor-readable storage media that can be accessed by a computer. By way of example, and not limitation, such processor-readable media can comprise RAM, ROM, EEPROM, CD-ROM or other optical disk storage, magnetic disk storage or other magnetic storage devices, or any other tangible storage medium that can be used to store desired program code in the form of instructions or data structures and that can be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and/or instructions on a processor-readable medium and/or computer-readable medium, which can be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein can be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system, comprising:

a computer comprising at least one processor, configured to:

receive error metadata associated with an operation error of a plurality of operation errors identified by one or more systems involved in the plurality of operation errors;

execute, according to a preconfigured mapping, a first debug operation set for determining a first result associated with the operation error using the error metadata, the first result indicating a second debug operation set;

execute, according to the preconfigured mapping, the second debug operation set for determining a second result using the error metadata, the second result indicating a report generation operation; and generate, by executing the report generation operation indicated by the second result, an error report comprising updated error metadata based on the first result and the second result.

2. The system of claim 1, wherein the first debug operation set corresponds to a first error scenario, and wherein the second debug operation set corresponds to a second error scenario that is mapped to the first error scenario.

3. The system of claim 1, wherein the at least one processor is further programmed to obtain, according to a first debug operation, data associated with execution of an executable operation represented by the error metadata, and wherein the at least one processor determines the first result using the data associated with the execution of the executable operation.

4. The system of claim 3, wherein the error report represents a root cause of the operation error using the first result and the second result.

5. The system of claim 1, wherein the at least one processor that determines the second result associated with the second debug operation is programmed to determine the second result by executing a second debug operation of the second debug operation set, the second debug operation set having one or more debug operations different from the one or more debug operations of the first debug operation set.

6. The system of claim 1, wherein the at least one processor is further programmed to:

compare a value associated with execution of an executable operation against one or more accepted values, the one or more accepted values associated with executable operations with successful executions, and wherein the at least one processor determines the first result or the second result based on comparing the value associated with the execution of the executable operation against the one or more accepted values.

7. The system of claim 1, wherein the at least one processor is further programmed to generate a next error report based on the second result indicating that criteria associated with a subsequent debug operation set for an application is satisfied.

8. A method, comprising:

receiving, by at least one processor, error metadata associated with an operation error of a plurality of operation errors identified by one or more systems involved in the plurality of operation errors;

executing, by the at least one processor and according to a preconfigured mapping, a first debug operation set for determining a first result associated with the operation error using the error metadata, the first result indicating a second debug operation set;

executing, by the at least one processor and according to the preconfigured mapping, the second debug operation set for determining a second result using the error metadata, the second result indicating a report generation operation; and generating, by the at least one processor and by executing the report generation operation indicated by the second result, an error report comprising updated error metadata based on the first result and the second result.

9. The method of claim 8, wherein the first debug operation set corresponds to a first error scenario, and wherein the second debug operation set corresponds to a second error scenario that is mapped to the first error scenario.

10. The method of claim 8, wherein the at least one processor is further programmed to obtaining, by the at least one processor and according to a first debug operation, data associated with execution of an executable operation represented by the error metadata, and wherein the at least one processor determines the first result using the data associated with the execution of the executable operation.

11. The method of claim 10, further comprising generating, by the at least one processor, the error report representing a root cause of the operation error using the first result and the second result.

12. The method of claim 8, wherein determining the second result associated with the second debug operation comprises determining, by the at least one processor, the second result by executing a second debug operation of the second debug operation set, the second debug operation set having one or more debug operations different from the one or more debug operations of the first debug operation set.

13. The method of claim 8, further comprising:

comparing, by the at least one processor, a value associated with execution of an executable operation against one or more accepted values, the one or more accepted values associated with executable operations with successful executions, and determining, by the at least one processor, the first result or the second result based on comparing the value associated with the execution of the executable operation against the one or more accepted values.

14. The method of claim 8, further comprising generating, by the at least one processor, a next error report based on the second result indicating that criteria associated with a subsequent debug operation set for an application is satisfied.

15. A non-transitory, computer-readable medium storing instructions that, when executed by at least one processor, cause the at least one processor to:

receive error metadata associated with an operation error of a plurality of operation errors identified by one or more systems involved in the plurality of operation errors;

execute, according to a preconfigured mapping, a first debug operation set for determining a first result associated with the operation error using the error metadata, the first result indicating a second debug operation set;

execute, according to the preconfigured mapping, the second debug operation set for determining a second result using the error metadata, the second result indicating a report generation operation; and generate, by executing the report generation operation indicated by the second result, an error report comprising updated error metadata based on the first result and the second result.

16. The non-transitory, computer-readable medium of claim 15, wherein the first debug operation set corresponds to a first error scenario, and wherein the second debug operation set corresponds to a second error scenario that is mapped to the first error scenario.

17. The non-transitory, computer-readable medium of claim 15, wherein the instructions further cause the at least one processor to obtain, according to a first debug operation, data associated with execution of an executable operation represented by the error metadata, and wherein the instructions cause the at least one processor to determine the first result using the data associated with the execution of the executable operation.

18. The non-transitory, computer-readable medium of claim 17, wherein the instructions cause the at least one processor to generate the error report representing a root cause of the operation error using the first result and the second result.

19. The non-transitory, computer-readable medium of claim 15, wherein instructions that cause the at least one processor to determine the second result associated with the second debug operation cause the at least one processor to:

determine the second result by executing a second debug operation of the second debug operation set, the second debug operation set having one or more debug operations different from the one or more debug operations of the first debug operation set.

20. The non-transitory, computer-readable medium of claim 15, wherein the instructions that cause the at least one processor further cause the at least one processor to:

compare a value associated with execution of an executable operation against one or more accepted values, the one or more accepted values associated with executable operations with successful executions, and wherein the instructions cause the at least one processor to determine the first result or the second result based on comparing the value associated with the execution of the executable operation against the one or more accepted values.

* * * * *